O. A. SMITH.
MILK BOTTLE HANGER.
APPLICATION FILED MAR. 21, 1919.
1,339,792.
Patented May 11, 1920.
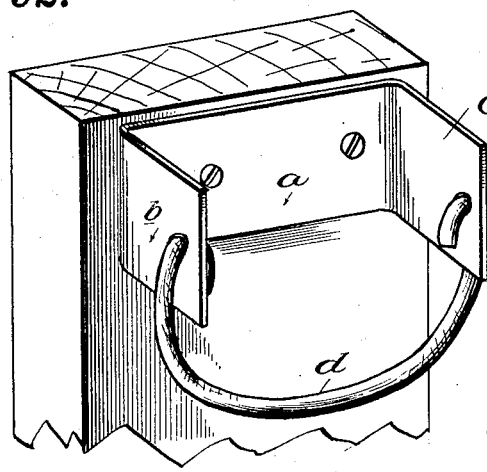
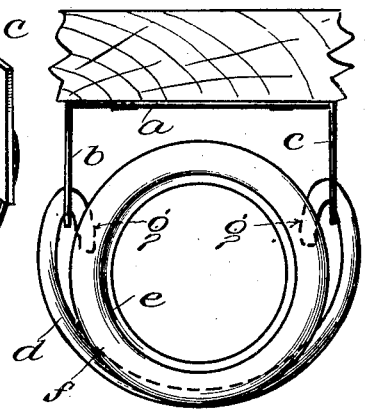
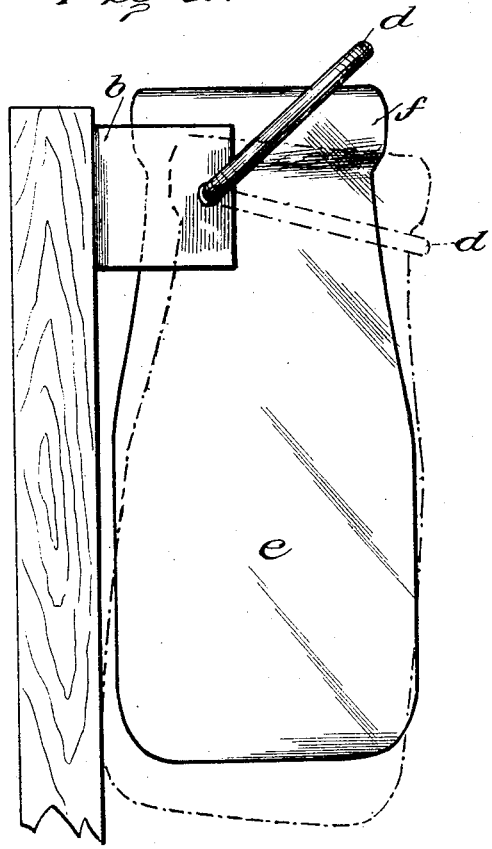
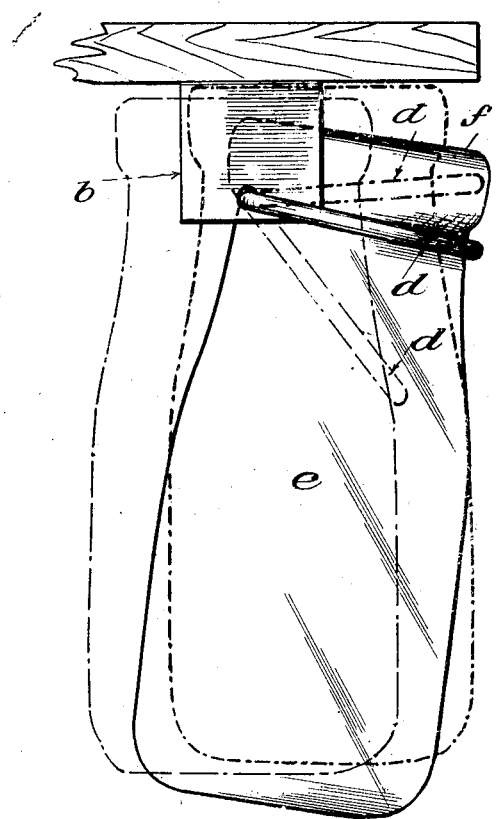
Inventor:
Oliver Albert Smith.

UNITED STATES PATENT OFFICE.

OLIVER A. SMITH, OF SEATTLE, WASHINGTON.

MILK-BOTTLE HANGER.

1,339,792.  Specification of Letters Patent.  Patented May 11, 1920.

Application filed March 21, 1919. Serial No. 283,988.

*To all whom it may concern:*

Be it known that I, OLIVER ALBERT SMITH, a citizen of the United States, resident of the city of Seattle, county of King, State of Washington, have invented a new and useful Milk-Bottle Hanger, of which the following is the specification.

The object of my invention is to provide a handy, simple and inexpensive device for suspending a milk bottle from a wall, shelf, post or other support, and, furthermore, a device in which the bottle may be readily inserted and as readily removed with one hand.

My invention may be readily understood by having reference to the accompanying drawings in which—

Figure 1 is a perspective view showing my device applied to a supporting post;

Fig. 2 is a side elevation agreeing with Fig. 1;

Fig. 3 is a top view relating to Figs. 1 and 2, and

Fig. 4 illustrates my device as applied to the bottom side of a projecting ledge or other horizontal support.

My device consists of a plate $a$, the sides $b$ $c$ of which are bent at right angles and perforated, said sides forming ears in which a bail $d$ of wire is hinged, as in the manner more clearly illustrated in Fig. 3. The bail $d$ is made in the form of a half-loop, so as to be adapted to encircle the neck of the bottle (represented by $e$ in each of Figs. 2 to 4 inclusive), said bottle being of the ordinary milk bottle type made with a rim $f$ at its mouth. The extremities $g$ of the wire bail are bent as illustrated in Fig. 3, and so as to be located rearward of the longitudinal center of the bottle when the latter is suspended from the bail $d$ as also illustrated in Fig. 3.

Supposing my device to be affixed to an upright support, the manner of using said device would be as follows: In the first instance, the bottle $e$ will be placed under the bail $d$ and the latter lifted as illustrated in full lines in Fig. 2. The bottle is then slightly moved to the left which will cause the bail to drop down to its position shown in dotted outline in Fig. 2, and the bail will then encircle the neck of the bottle under its rim and support it as illustrated by having reference to Figs. 2 and 3. In case my device is to be affixed under a horizontal support, as is illustrated in Fig. 4, the bail $d$ will, of course, hang pendant, the bottle will be moved into the bail, and in so doing lift the latter from its lower position shown in dotted outlines to its upper position also shown in dotted outlines in Fig. 4, and then moving the bottle to the right so as to cause the bail to encircle the neck of the bottle under its rim as indicated in full outlines in Fig. 4.

I claim:

1. A bottle hanger consisting of a bracket comprising a part adapted for fastening to a support and having parallel perforated ears and bail suspended from said bracket, said bail made of wire formed in the shape of a half loop and adapted to encircle the neck of the bottle below the rim at the mouth, the ends of the bail being turned inward and constituting lips so located as to engage with said neck and under said rim rearward of the longitudinal center of the bottle.

2. A bottle hanger consisting of a supporting element and bail suspended from said supporting element, said bail made of wire formed in the shape of a half loop and adapted to encircle the neck of the bottle below the rim at the mouth, the ends of the bail being turned inward and constituting lips so located as to engaged with said neck and under said rim rearward of the longitudinal center of the bottle.

OLIVER A. SMITH.